United States Patent Office 2,769,848
Patented Nov. 6, 1956

2,769,848

SYNTHESIS OF 3,3-DIMETHYL-1,5-DICHLORO-PENTANE

Arthur William Anderson, Wilmington, Del., assignor to E. I. du Pont de Nemours and Company, Wilmington, Del., a corporation of Delaware No Drawing. Application December 10, 1954, Serial No. 474,599

3 Claims. (Cl. 260—658)

This invention relates to the synthesis of 3,3-dimethyl-1,5-dichloropentane.

Recently 4,4-dimethylheptamethylenediamine has become important as a resin intermediate, especially in the manufacture of 4,4-dimethylheptamethylenepolypyromellitimide. No suitable methods for preparing this diamine on a large scale have been disclosed heretofore, however.

An object of the present invention is to provide a process for making an intermediate, namely 3,3-dimethyl-1,5-dichloropentane, which is useful in the manufacture of 4,4-dimethylheptamethylenediamine.

It has been discovered in accordance with the present invention that 3,3-dimethyl-1,5-dichloropentane can be prepared by reaction between ethylene and 2,2-dichloropropane in the presence of anhydrous aluminum chloride as catalyst.

The reaction between ethylene and 2,2-dichloropropane to form 3,3-dimethyl-1,5-dichloropentane in the presence of anhydrous aluminum chloride takes place preferably at temperatures in the range of $-40°$ C. to $+10°$ C. The reaction takes place at atmospheric pressure, but it is desirable to employ superatmospheric pressures suitably in the range of from 1 to 55 atmospheres. Higher pressures can, of course, be employed if desired, but pressures in excess of 55 atmospheres are not essential for optimum results.

The preferred catalyst is reagent grade AlCl$_3$, although excellent results are also obtained with AlCl$_3$·HCl complex. It is, of course, essential that the catalyst be completely anhydrous.

Certain inert organic solvents can be employed if desired, but it is generally helpful to carry out the reaction in the absence of any reaction medium. The quantity of solvent which is employed can be varied over a very wide range. Relatively small amounts of catalyst are surprisingly effective. On the other hand, very large quantities of catalyst can be employed although of course this is undesirable from a standpoint of recovery of the desired reaction product. The reaction between ethylene and 2,2-dichloropropane takes place at a rapid rate when the quantity of catalyst is from 0.5% to 25% of the weight of 2,2-dichloropropane.

Any suitable reaction vessel may be employed in the practice of the invention such as vessels made of or lined with stainless steel, glass, noble metals, etc. The reaction vessel should be equipped with a high speed stirrer since stirring is especially helpful particularly when the reaction pressure is low.

In preferred embodiments of the invention, no attempt is made to recover the anhydrous aluminum chloride catalyst. This can be done by filtering the reaction mixture at very low temperature, but in practical operations it is preferred to employ a relatively small quantity of catalyst and to eliminate recovery operations so far as the catalyst is concerned.

A suitable method for separating the reaction products is to wash the entire mixture with water after the reaction is complete in order to remove hydrochloric acid and dissolved catalyst followed by simple distillation of the resulting organic phase. A small amount of 2,2-dichloropropane is generally recovered unchanged in this manner, and this, of course, can be employed in a later batch operation for the preparation of an additional quantity of 3,3-dimethyl-1,5-dichloropentane. The remainder of the liquid reaction product upon distillation yields a series of fractions the largest of which is 3,3-dimethyl-1,5-dichloropentane (B. P., 90–100° C./13–15 mm., refractive index at 25° C., D line=1.4640).

The invention is illustrated further by means of the following example:

A mixture of 113 grams (1 mole) of 2,2-dichloropropane and 11.3 grams (10%) of reagent grade anhydrous aluminum chloride was charged into a shaker tube and cooled to $-30°$ C. While the temperature was maintained at $-20°$ C. shaking was started and ethylene was admitted to a pressure of 300 pounds per square inch. Pressure was maintained at this figure by replacing the ethylene used in the reaction and the tube was shaken for one hour at $-20°$ C. The mixture was then poured over one liter of cold 20 percent hydrochloric acid to remove the catalyst. The organic layer was separated and distilled affording 22.6 grams starting material, B. P. 68–75° at atmospheric pressure, $n_D^{25}=1.4120$.
4.1 grams 2-methyl-2,4-dichlorobutane, B. P. 34–72°/15 mm., $n_D^{25}=1.4425$.
56.4 grams of 3,3-dimethyl-1,5-dichloropentane, B. P. 90–100°/13–15 mm., $n_D^{25}=1.4640$.

This represents a yield of forty percent and a conversion of 80 percent.

It is to be understood that the foregoing example is illustrative only and that numerous modifications of the procedure described therein can be made if desired. For example, pure anhydrous aluminum chloride can be used or aluminum chloride which has been treated with anhydrous hydrogen chloride to form AlCl$_3$·HCl complex.

As illustrated in the foregoing example, one of the products which is produced simultaneously with 3,3-dimethyl-1,5-dichloropentane, is 2-methyl-2,4-dichlorobutane. This compound is produced by the reaction of only one molecule of ethylene with a molecule of 2,2-dichloropropane. It can be recycled with additional ethylene to produce further quantities of 3,3-dimethyl-1,5-dichloropentane. By repeatedly recycling the recovered 2-methyl-2,4-dichlorobutane, the quantity of this material which is present in successive batches of reaction product reaches a constant level, and further loss of reactants in the formation of this material is thus avoided.

The method of converting 3,3-dimethyl-1,5-dichloropentane to 4,4-dimethylheptamethylenediamine is not within the scope of the present invention, but methods for converting haloalkanes to cyanoalkanes followed by hydrogenation of the said cyanoalkanes are applicable in converting the dichloride to the desired diamine. For example, when 75 grams of 3,3-dimethyl-1,5-dichloropentane and 57.2 grams of sodium cyanide were heated for 3 hours in 150 grams of refluxing tetrahydrofurfuryl alcohol and the mixture was cooled, filtered and distilled, an 88% yield of 3,3-dimethyl-1,5-dicyanopentane (B. P. 195–196°/14 mm., refractive index at 23°, D line= 1.4551) was obtained. Hydrogenation of 80 grams of this 3,3-dimethyl-1,5-dicyanopentane in 60 grams of anhydrous ammonia with hydrogen under a pressure of 4500 pounds per square inch in the presence of a reduced cobalt oxide catalyst at 135° C. for 2.5 hours followed by filtration and distillation of the filtrate, gave a 92% yield of 4,4-dimethylheptamethylenediamine.

Since numerous embodiments of this invention will occur to those who are skilled in the art, it is to be understood that we do not limit ourselves except as set forth in the following claims.

I claim:

1. A process for the synthesis of 3,3-dimethyl-1,5-dichloropentane which comprises reacting ethylene with 2,2-dichloropropane in the presence of anhydrous aluminum chloride and thereafter recovering 3,3-dimethyl-1,5-dichloropentane from the resulting mixture.

2. A process for preparing 3,3-dimethyl-1,5-dichloropentane which comprises reacting ethylene with 2,2-dichloropropane in the presence of anhydrous aluminum chloride at a temperature within the range of $-40°$ C. to $+10°$ C. at a pressure of from 1 to 800 pounds per square inch whereby 3,3-dimethyl-1,5-dichloropentane is produced and thereafter separating the said 3,3-dimethyl-1,5-dichloropentane from the resulting mixture.

3. Process of claim 2 wherein the quantity of anhydrous aluminum chloride is from 0.5% to 25% of the weight of 2,2-dichloropropane initially present.

References Cited in the file of this patent

UNITED STATES PATENTS 2,533,053    Schmerling  ------------ Dec. 5, 1950